US011933429B2

(12) United States Patent
Liesfeld, III (10) Patent No.: US 11,933,429 B2
(45) Date of Patent: Mar. 19, 2024

(54) METHOD FOR EXCAVATING A DITCH AND INSTALLING AN UNDERGROUND PIPE

(71) Applicant: Joseph Earl Liesfeld, III, Manakin Sabot, VA (US)

(72) Inventor: Joseph Earl Liesfeld, III, Manakin Sabot, VA (US)

(73) Assignee: Joseph Earl Liesfeld, III, Manakin Sabot (VA)

( * ) Notice: Subject to any disclaimer, the term of this patent is extended or adjusted under 35 U.S.C. 154(b) by 388 days.

(21) Appl. No.: 17/399,210

(22) Filed: Aug. 11, 2021

(65) Prior Publication Data

US 2022/0049794 A1 Feb. 17, 2022

Related U.S. Application Data

(60) Provisional application No. 63/065,231, filed on Aug. 13, 2020.

(51) Int. Cl.
*F16L 1/028* (2006.01)
*E02F 3/43* (2006.01)
*E02F 5/22* (2006.01)

(52) U.S. Cl.
CPC ............ *F16L 1/028* (2013.01); *E02F 3/435* (2013.01); *E02F 5/223* (2013.01)

(58) Field of Classification Search
CPC ............ F16L 1/028; E02F 3/842; E02F 3/841
See application file for complete search history.

(56) References Cited

U.S. PATENT DOCUMENTS

2016/0312446 A1* 10/2016 Pettersson .............. H04N 7/181

FOREIGN PATENT DOCUMENTS

FR 2857739 * 1/2005

* cited by examiner

*Primary Examiner* — Sean D Andrish
(74) *Attorney, Agent, or Firm* — Williams Mullen; F. Michael Sajovec (57) ABSTRACT

A method for excavating a ditch and installing an underground pipeline. The method includes excavating a ditch utilizing a predetermined GPS model having grading and alignment requirements for the ditch and the underground pipeline and inserting pipes into the ditch. A laser beam is projected from a laser beam apparatus in association with a first pipe section that utilizes the grading and alignment requirements of the predetermined GPS model to guide excavation and installation of one or more sections of pipes. A remote-controlled vehicle is inserted into the first pipe and is configured to focus the projected laser beam to guide excavation and installation of successive pipe sections. The remote-controlled vehicle is navigated through the pipeline during installation to guide grading of subsequent ditch sections and alignment of additional pipe sections.

7 Claims, 16 Drawing Sheets

METHOD FOR EXCAVATING A DITCH AND INSTALLING AN UNDERGROUND PIPE

RELATED APPLICATION

The following application claims priority to U.S. Provisional No. 63/065,231, filed Aug. 13, 2020, the disclosure of which is incorporated by reference in its entirety.

FIELD OF THE INVENTION

The present invention relates to underground pipe installation, and in particular, to a pipe installation method that does not require workmen within a trench.

BACKGROUND

Underground pipes are generally installed by digging a ditch, inserting the pipeline within and then backfilling the ditch above the pipeline with dirt and compacting the dirt. These ditches must be excavated with specific grading requirements, and pipelines spanning long distances must be installed in sections. During installation, pipe sections are inserted into the ditch in succession and are carefully aligned with sloping and changing gradient before being connected.

Moreover, larger pipelines typically require personnel to be inside the trench to guide insertion of the pipe section and alignment with the partially assembled pipeline using specialized equipment. Additionally, the grading of the bedding and aggregate under the pipe section must be monitored for consistency and correctness by a piper layer manually grading with a shovel. Each pipe section is inserted into the ditch using cables, slings or straps connected to the excavator. This process may pose a serious safety hazard as the pipe may detach when suspended above the trench and crush the personnel underneath it. To prevent these scenarios, ditches are excavated with slopes and trench boxes are provided within. However, these solutions do not completely eliminate the possibility of workmen in the trench from being injured by overhead pipe sections. Thus, there is a need for a method for installing underground pipes with improved safety and to substantially reduce the need for workmen in the trench.

SUMMARY

To this end, the present invention is directed to a system and method for installing pipes underground without requiring workmen to be within a trench to align and install the pipe sections. The absence of workmen in the trench line negates the need for ditch boxes or sloping the trench and eliminates the possibility of them being injured by an overhead pipe section being installed. Moreover, lifting cables, hooks or clevises are not required to lift pipe sections using the present system and method described herein.

Accordingly, one aspect of the present invention is directed to a method for excavating a ditch and installing an underground pipeline. A first ditch section of a ditch is excavated and prepared utilizing a predetermined GPS model which has grading, stone, and alignment requirements for the ditch and the underground pipeline. A first pipe and a laser beam apparatus associated therewith are both inserted into the first ditch section. Using the laser beam apparatus, a laser beam is projected based on the grading and alignment requirements of the predetermined global positioning system ("GPS") model. A remote-controlled vehicle is inserted into the first pipe and a second pipe is then inserted into an excavated second ditch section. The second pipe is connected to the first pipe using the laser beam projected from the laser beam apparatus to the remote-controlled vehicle to guide grading of the excavated second ditch section and alignment of the second pipe with the first pipe.

Additional ditch sections are excavated and additional pipe sections are inserted into these ditch sections and connected together. These steps are guided by the laser beam focused using the remote-controlled vehicle with a remote controlled target and a camera with real-time video capabilities. As each pipe section is aligned and connected by the operator, the remote-controlled vehicle is navigated to the last installed pipe section from the previous one adjacent thereto. In this manner, the operator may continue to guide the pipes via the target and the camera to continue aligning additional pipes.

These and other aspects will become apparent to those skilled in the art after a reading of the following description of the embodiments when considered with the drawings.

DETAILED DESCRIPTION OF THE EMBODIMENTS

The foregoing and other aspects of the present invention will now be described in more detail with respect to the description and methodologies provided herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise. Also, as used herein, "and/or" refers to and encompasses any and all possible combinations of one or more of the associated listed items.

As used herein, the terms "comprise," "comprises," "comprising," "include," "includes" and "including" specify the presence of stated features, integers, steps, operations, elements, and/or components, but do not preclude the presence or addition of one or more other features, integers, steps, operations, elements, components, and/or groups thereof.

All patents, patent applications and publications referred to herein are incorporated by reference in their entirety. In case of a conflict in terminology, the present specification is controlling.

Figure 1:
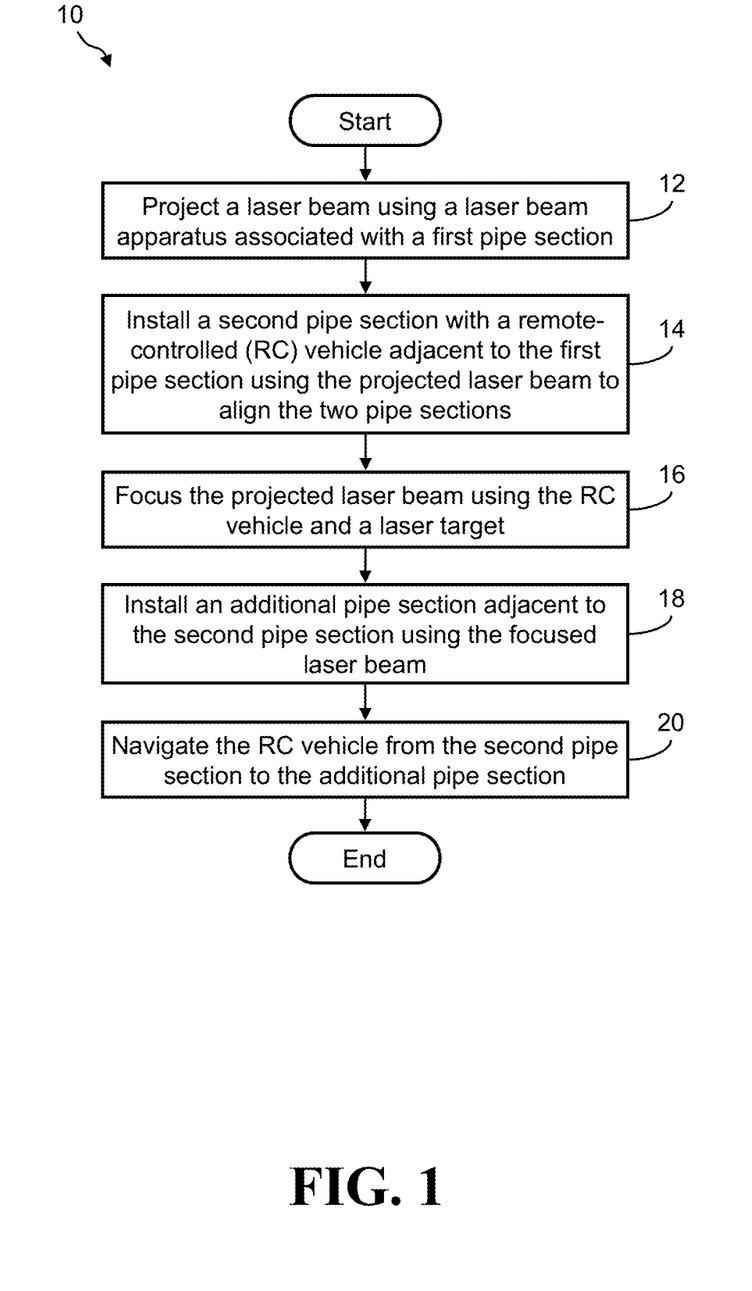
FIG. 1 is a flowchart of a method for aligning and installing a pipe section according to one embodiment.

FIG. 1 provides an overview of a method 10 for using a projected laser beam to guide grading of a ditch and alignment of pipe sections according to one embodiment. A laser beam apparatus is inserted in front of a first pipe section and projects a laser beam to guide alignment of a second pipe section 12. It is understood that other beams e.g. (x-ray, sound) equivalent to a laser beam may be utilized. The second pipe section is inserted into the trench and aligned with the first pipe section using the projected laser beam 14. The second pipe section is equipped with a remote-controlled (RC) vehicle configured to focus and further project the laser beam 16 to assist with ditch excavation, grading and installation of additional pipe sections 18. This is accomplished by navigating the RC vehicle along the pipeline during installation 20. Use of the RC vehicle enables re-positioning of the pipe section on the pipe hook to the target and laser beam to maintain accurate guidance and alignment at long distances without a workman being in the ditch. The RC vehicle may also include a video camera so that the process of the grading and installation may be monitored and controlled in real time from the cab of the excavator by the operator. It is recognized that monitoring by an operator in the cab may be replaced by a computer with artificial intelligence and image recognition software.

FIG. 2A-2M provide an example for using a RC vehicle to guide pipe installation according to one embodiment. An excavator 110 with a bucket 112 or other similar attachment for digging is provided at a landsite. In some embodiments, the digging excavator 110 is a GPS digging excavator including a global positioning system/global navigation satellite system control system with sensors, monitors and antennas (e.g., GPS antennas and/or radio antennas) for guiding excavation of a ditch 120 at the landsite based on a generated predetermined three-dimensional model. The operator compartment of the excavator may include a monitor for access to the video camera and the video feed of the RC vehicle.

Figure 2A:
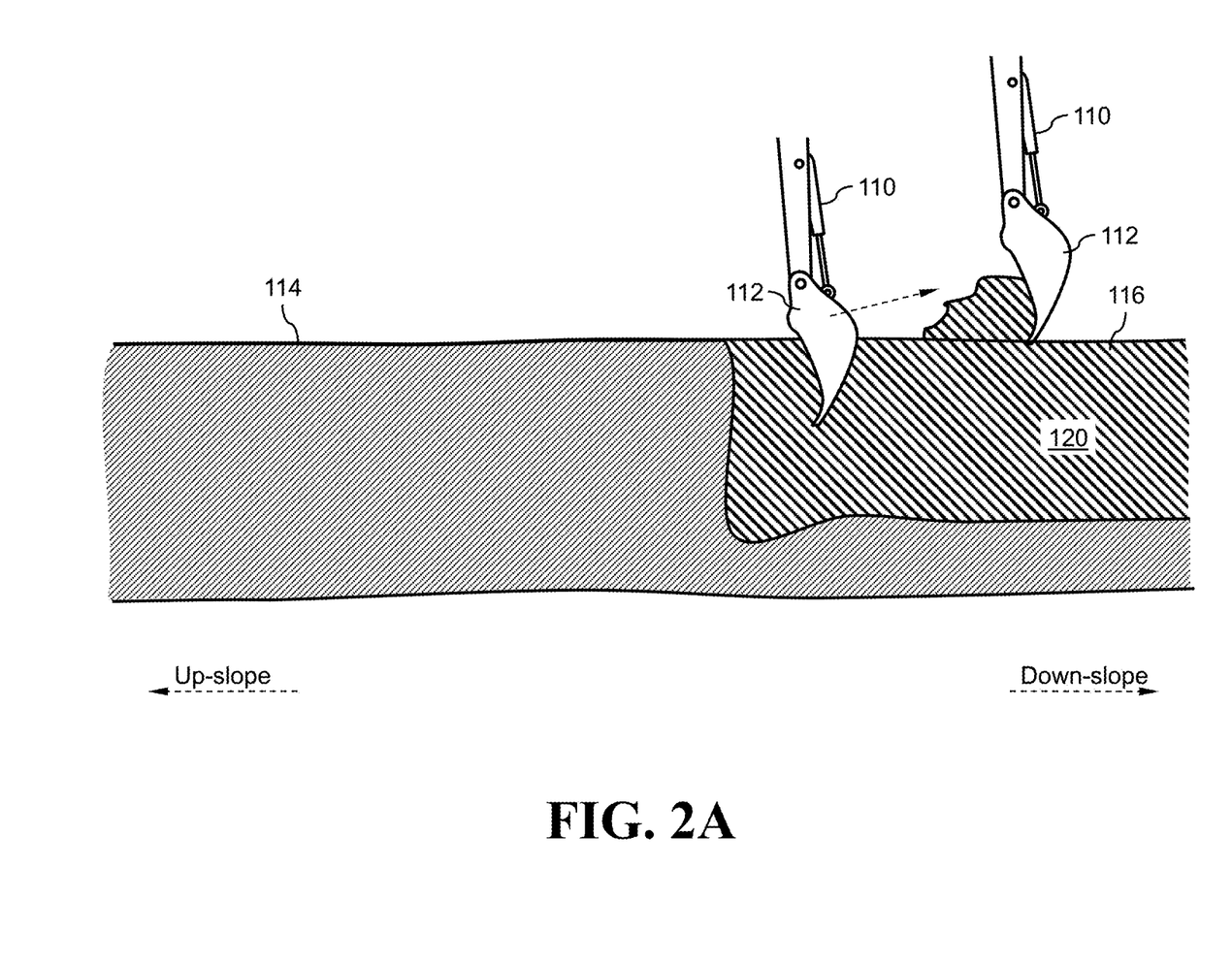
FIG. 2A is a cross-sectional side perspective view of a digging excavator excavating a first ditch section.

The GPS excavator 110 may communicate in tandem with GPS/Glonass and other satellite constellations while relating to state plane coordinates to determine accurate horizontal and vertical positions on the ground. This enables the digging excavator 110 to excavate the ditch underneath the pipe to a very high level of accuracy without any back checks. The excavator 110 uses a three-dimensional model (e.g., a model created in AutoCAD programs) from designs of engineered drawings. In operation, the GPS digging excavator may operate in a semi-automatic mode, wherein the excavator bucket 112 is not allowed to over dig the model which allows the operator to cut the bottom of the ditch to a high level of accuracy using semi-automation of the machine. The semi-automatic mode functions by limiting the hydraulic pressures to each cylinder to maintain the bucket following the model design.

Figure 2B:
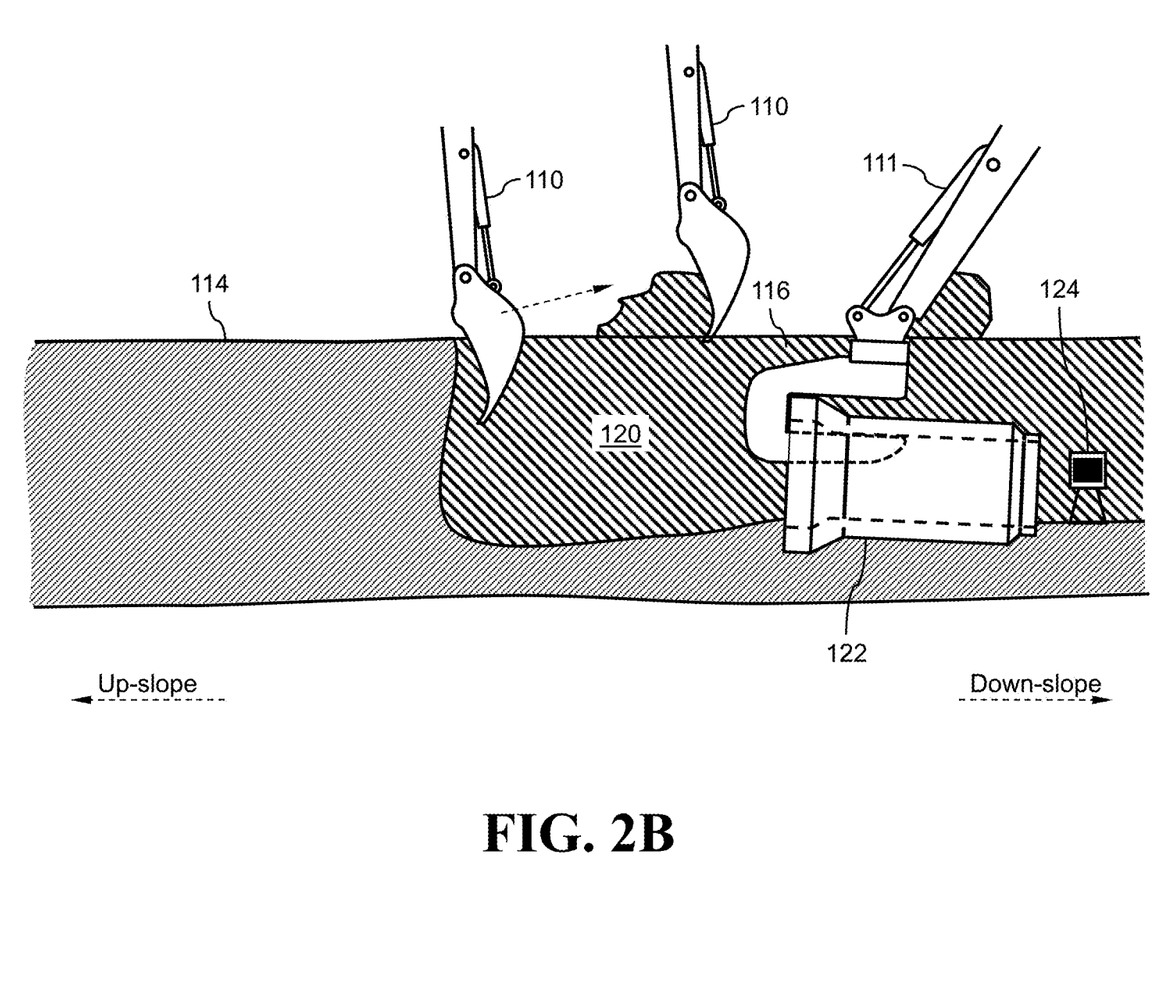
FIG. 2B is a cross-sectional side perspective view of an insertion excavator inserting a first pipe section and showing a laser beam apparatus.
Figure 2C:
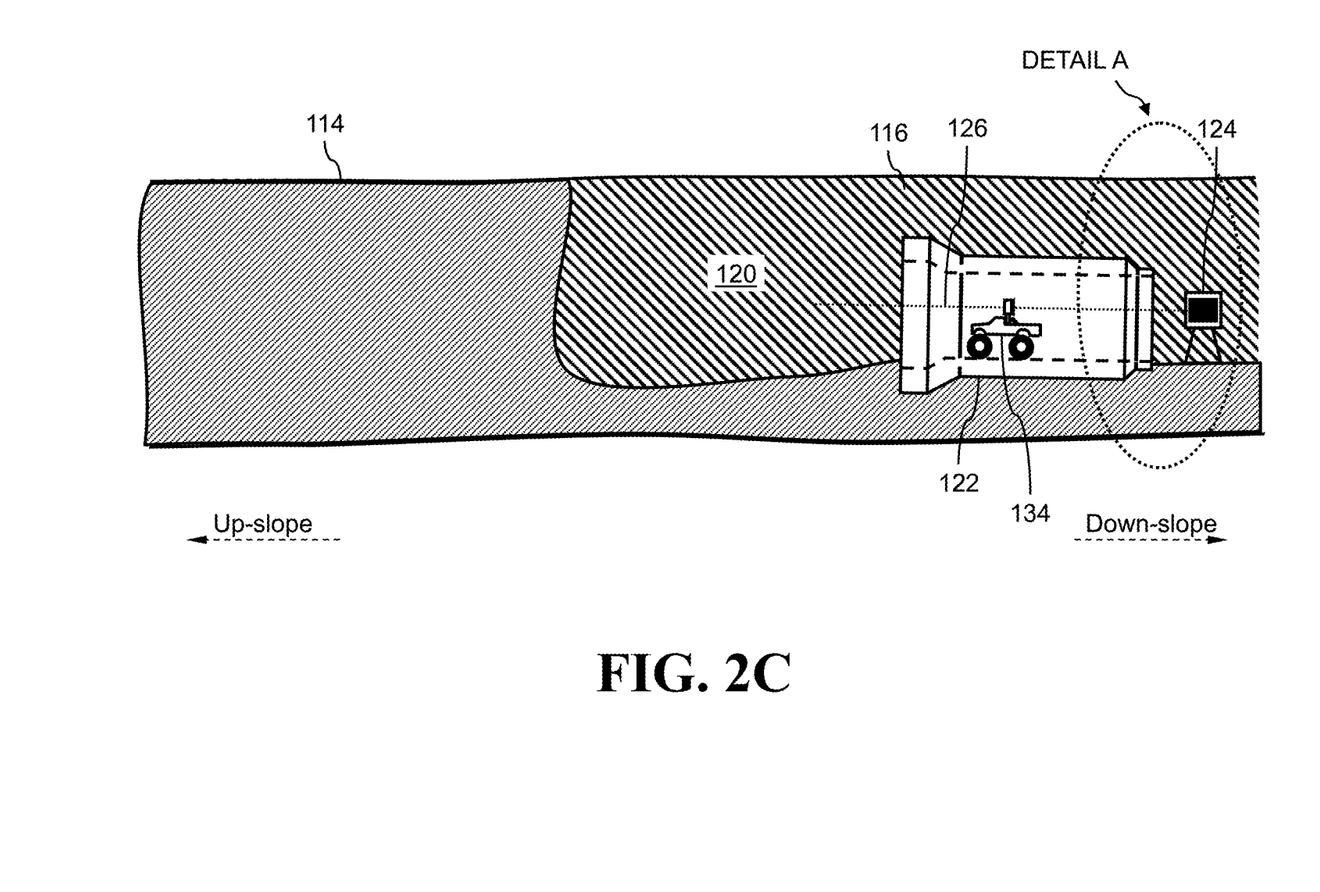
FIG. 2C is a cross-sectional side perspective view of the first pipe section installed.

As seen in FIG. 2A, the GPS digging excavator 110 equipped with the bucket 112 begins digging the ground 114 in accordance with the three-dimensional model to create a first ditch section 116 of a ditch 120. In one embodiment, the digging may occur toward the up-slope as shown in the Figures. FIGS. 2B and 2C show a laser beam apparatus 124 associated with a first pipe section 122 and both inserted into the first ditch section 116 using the insertion excavator 111. In some embodiments, the insertion excavator 111 is equipped with a pipe hook as shown, grapple hook attachment, a sling attachment or other means for lifting pipe sections and inserting them into the ditch 120. The insertion excavator may be controlled by the operator to move the pipe based on the placement of the laser beam on the target.

Figure 2D:
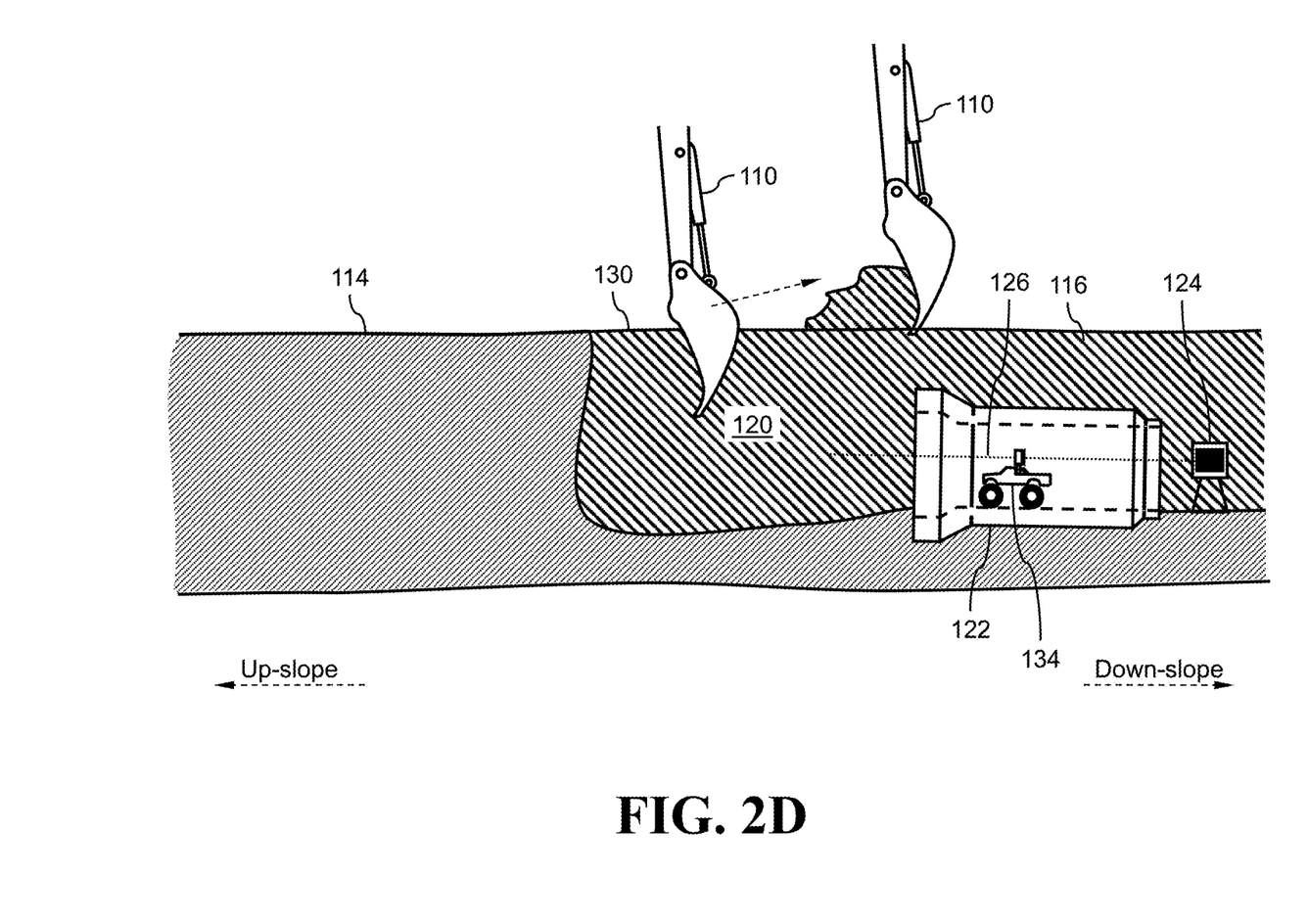
FIG. 2D is a cross-sectional side perspective view of the digging excavator excavating a second ditch section.
Figure 2E:
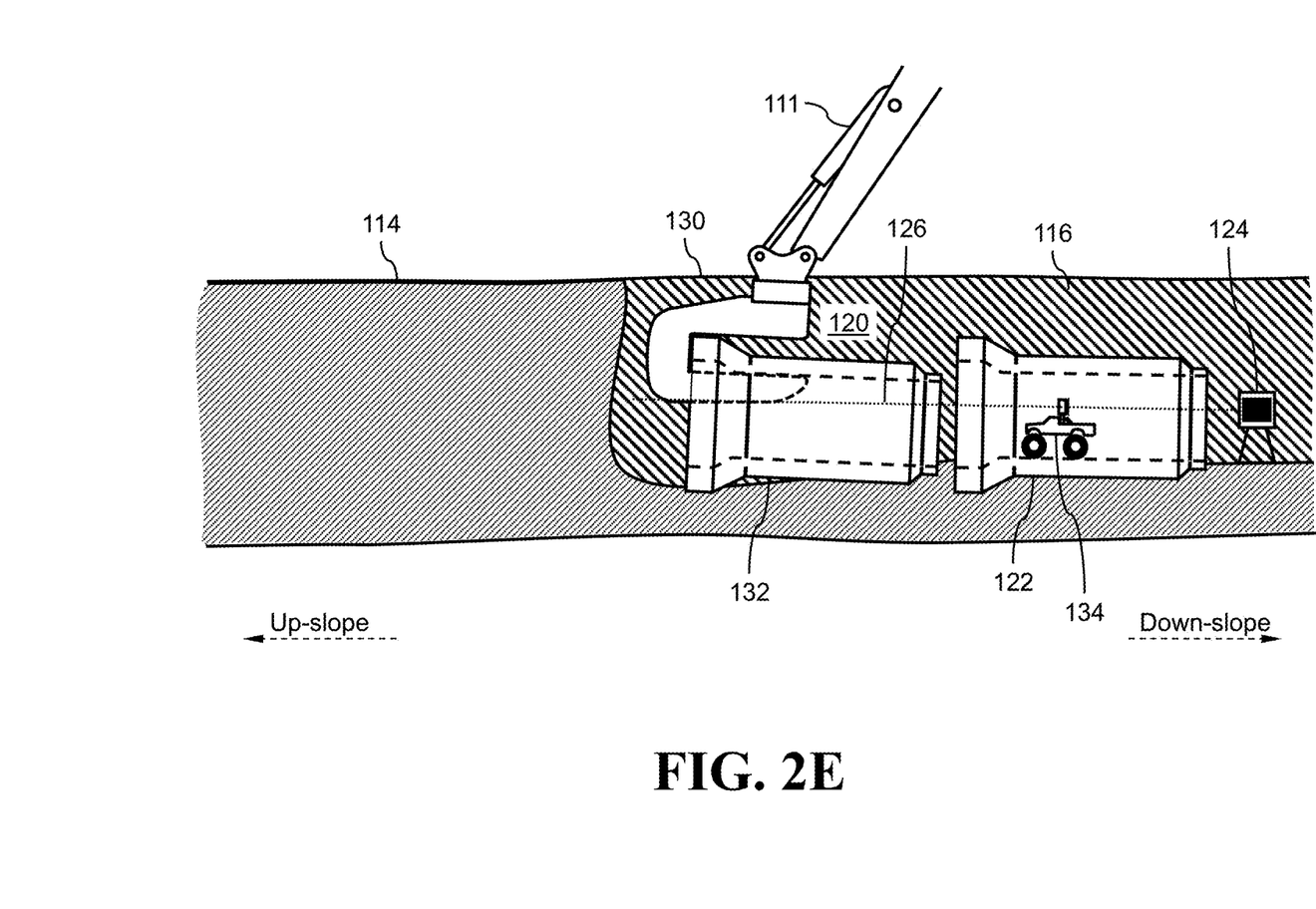
FIG. 2E is a cross-sectional side perspective view of the insertion excavator inserting a second pipe section.
Figure 2F:
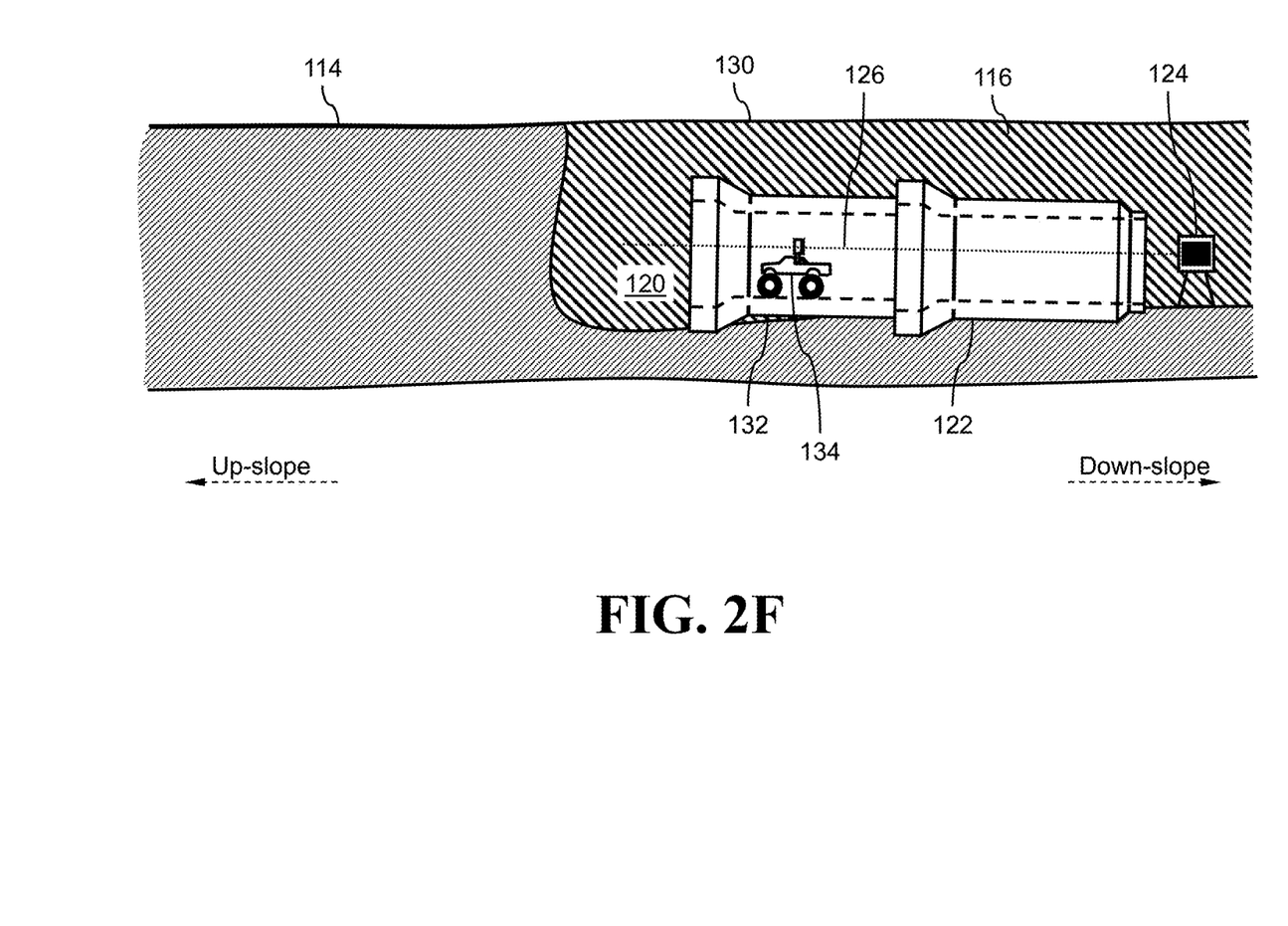
FIG. 2F is a cross-sectional side perspective view of the second pipe section equipped with a remote-controlled car.

As seen in FIGS. 2C-2E, the laser beam apparatus 124 projects a laser beam 126 through the first pipe section to assist with grading a second ditch section 130 with the digging excavator 110. Preferably the laser beam apparatus 124 may be located outside of the first pipe section 122 as shown. Alternatively, the laser beam apparatus may be in the first pipe section 122. The projected laser beam is calibrated based on the three-dimensional model specifications of the ditch 120. Once the second ditch section 130 is excavated and graded, the insertion excavator 111 inserts a second pipe section 132 into the second ditch section 130. As the second pipe section 132 enters the ditch 120, the projected laser beam 126 along with the RC vehicle 134 is used to align the second pipe section 132 with the first pipe section 116. The aligned pipe sections are then connected using any desired fittings as appropriate. The first ditch section is then back-filled using the digging excavator.

The RC vehicle 134 is provided to project the laser beam 126 at further distances and further calibrate the laser beam 126 as needed. In one embodiment, a single RC vehicle navigates through the pipe as illustrated in FIG. 2F-2L. In other embodiments, more than one RC vehicle and/or laser beam apparatus may be employed for pipelines at extended distances wherein alignment using one RC vehicle and laser beam apparatus is no longer feasible.

Figure 2G:
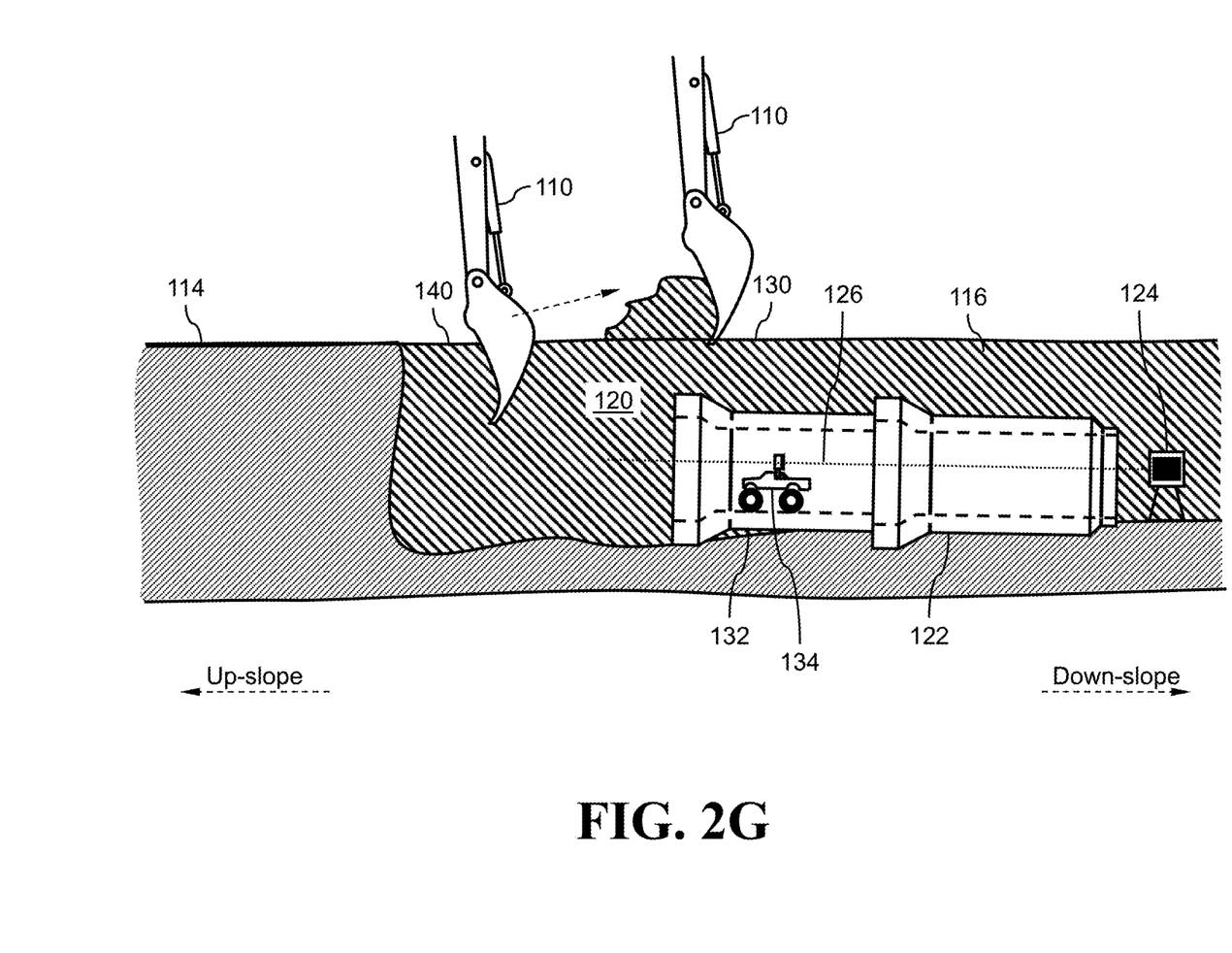
FIG. 2G is a cross-sectional side perspective view of the digging excavator excavating a third ditch section.
Figure 2H:
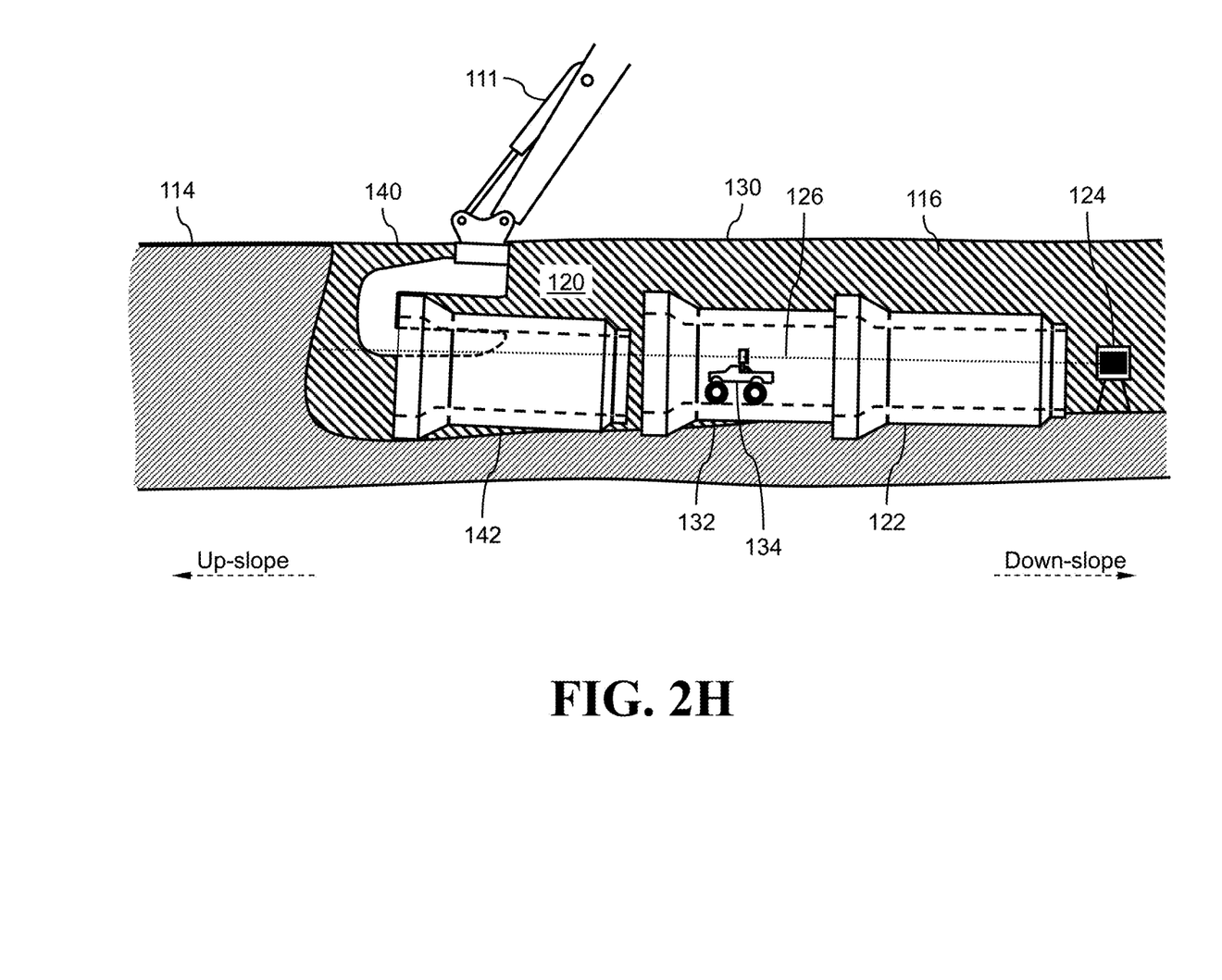
FIG. 2H is a cross-sectional side perspective view of the insertion excavator inserting a third pipe section.
Figure 2I:
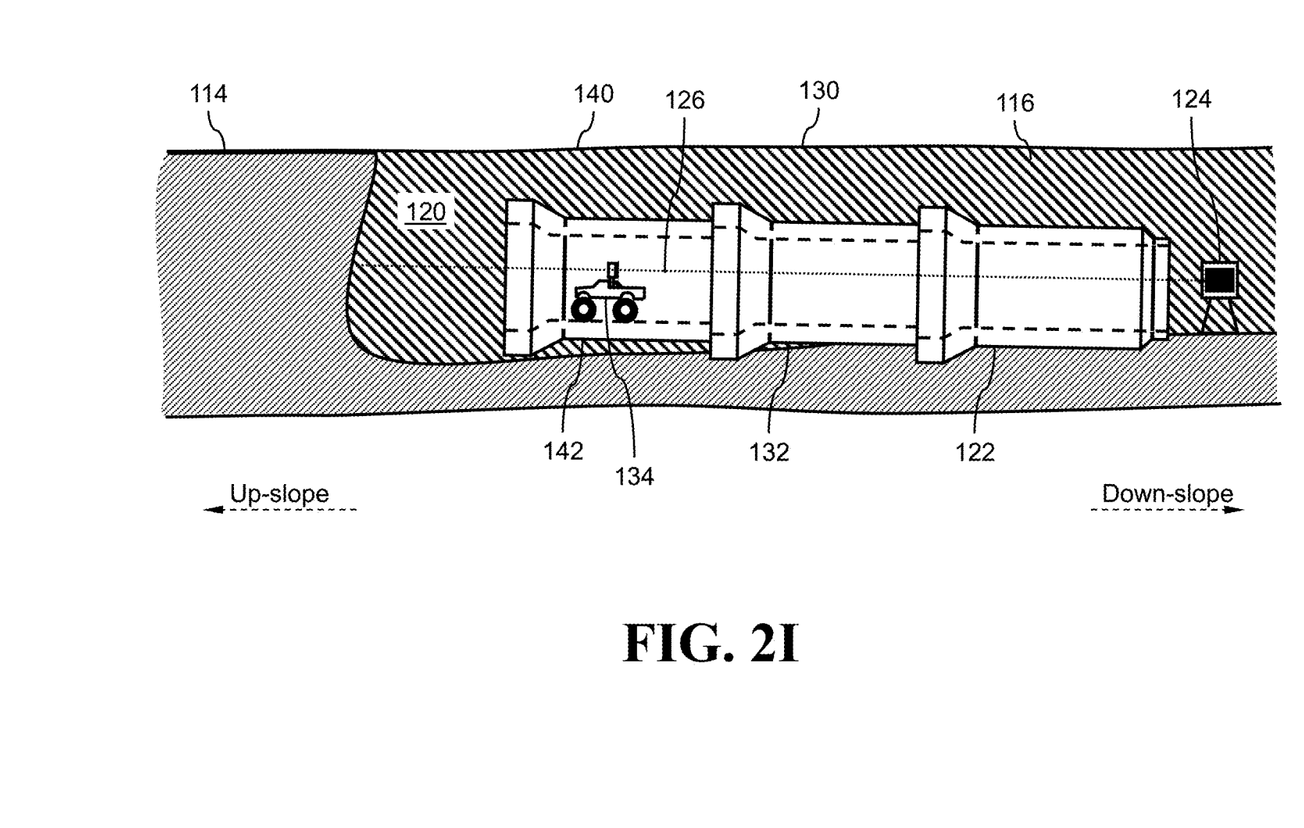
FIG. 2I is a cross-sectional side perspective view of the remote-controlled vehicle moving from the second pipe section to the third pipe section.

The RC vehicle 134 guides excavation and grading of a third ditch section 140 by the digging excavator 110 as seen in FIG. 2G. FIG. 2H shows the excavator 112 inserting a third pipe section 142 that is aligned to the second pipe section 132 using the laser beam 126 calibrated by the RC vehicle 134. Once the third pipe section 142 is connected, the RC vehicle 134 is then navigated from the second pipe section to the third pipe section 142 as seen in FIG. 2I.

Figure 2J:
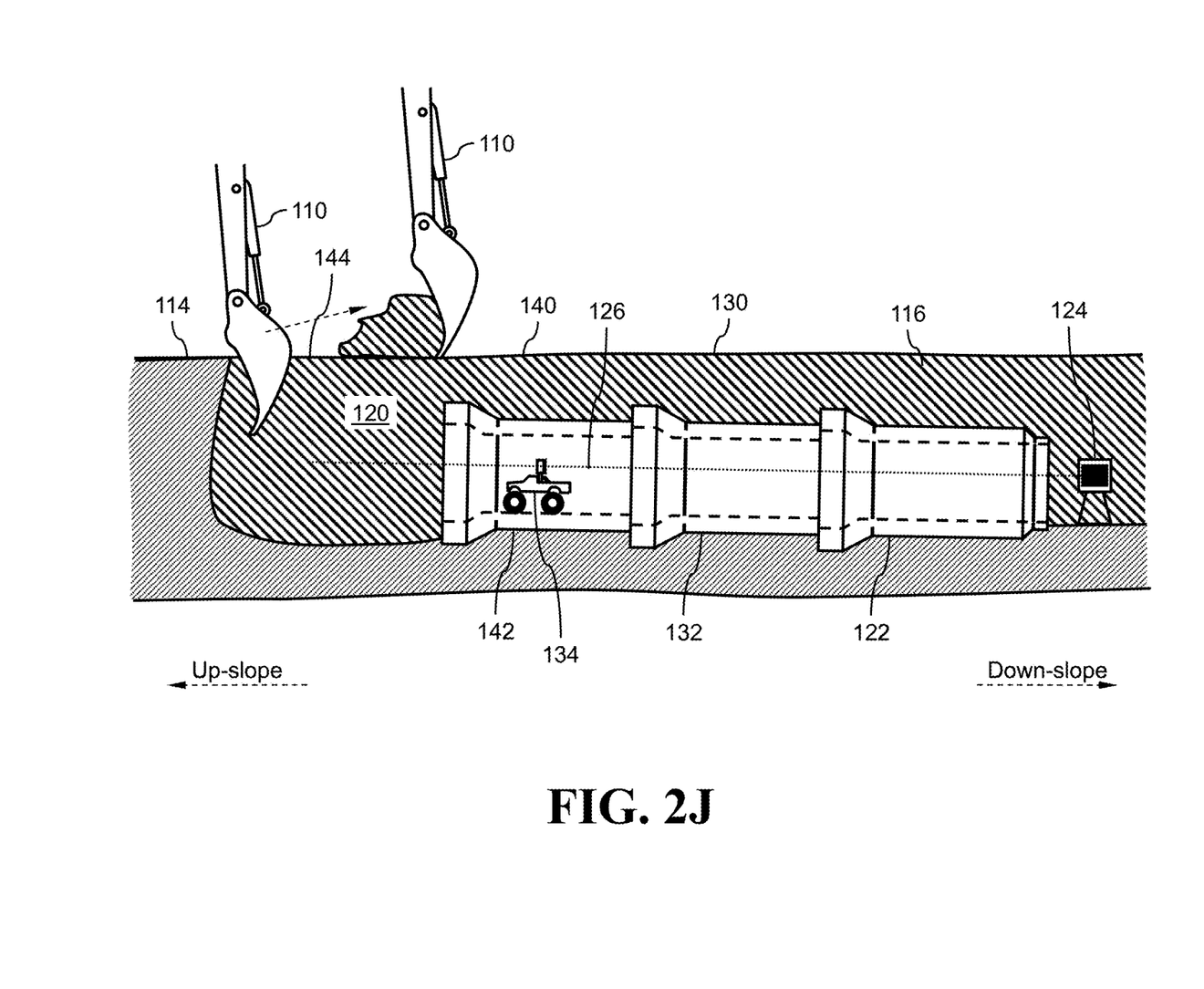
FIG. 2J is a cross-sectional side perspective view of the digging excavator excavating an additional ditch section.
Figure 2K:
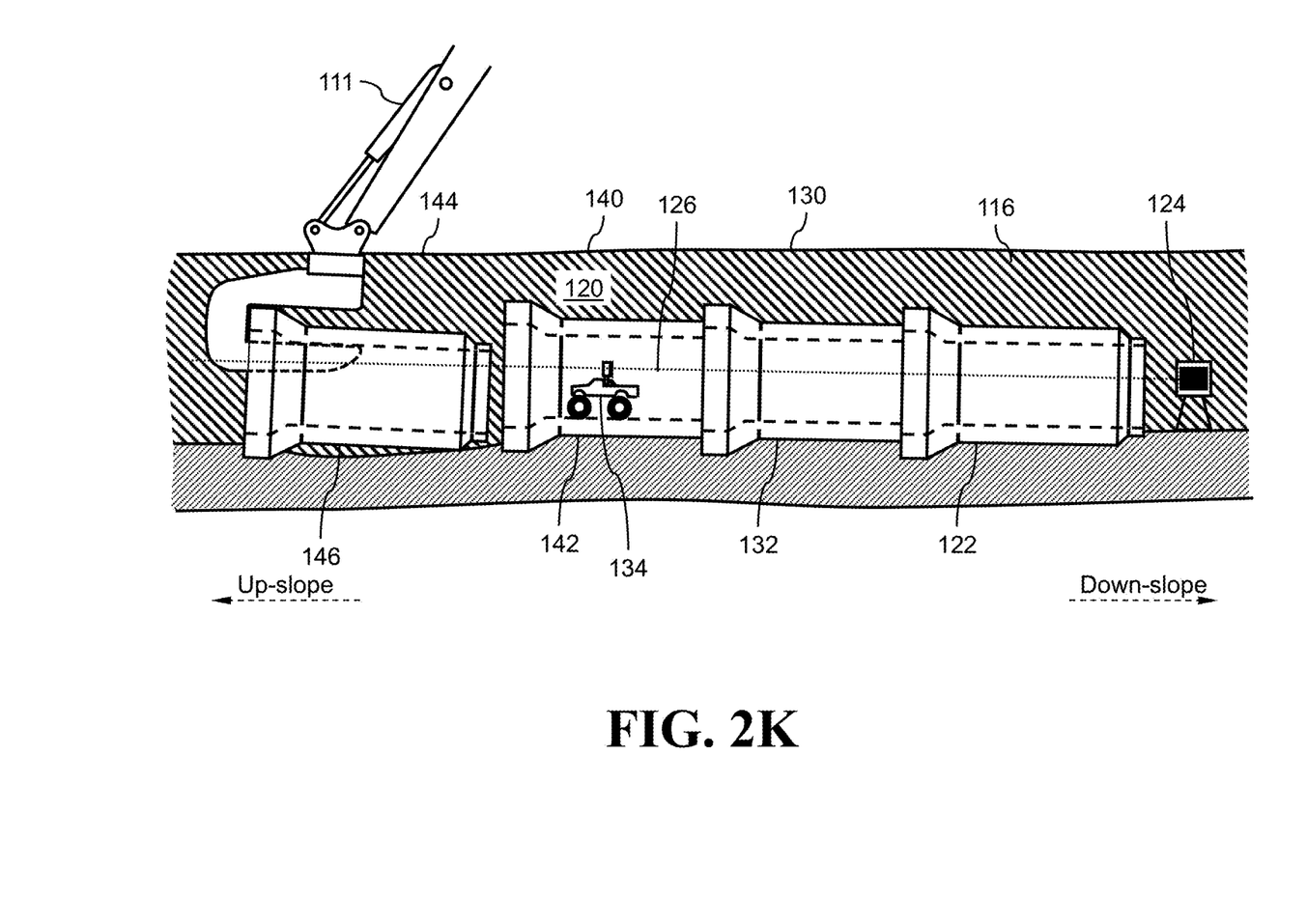
FIG. 2K is a cross-sectional side perspective view of the insertion excavator inserting an additional pipe section.
Figure 2L:
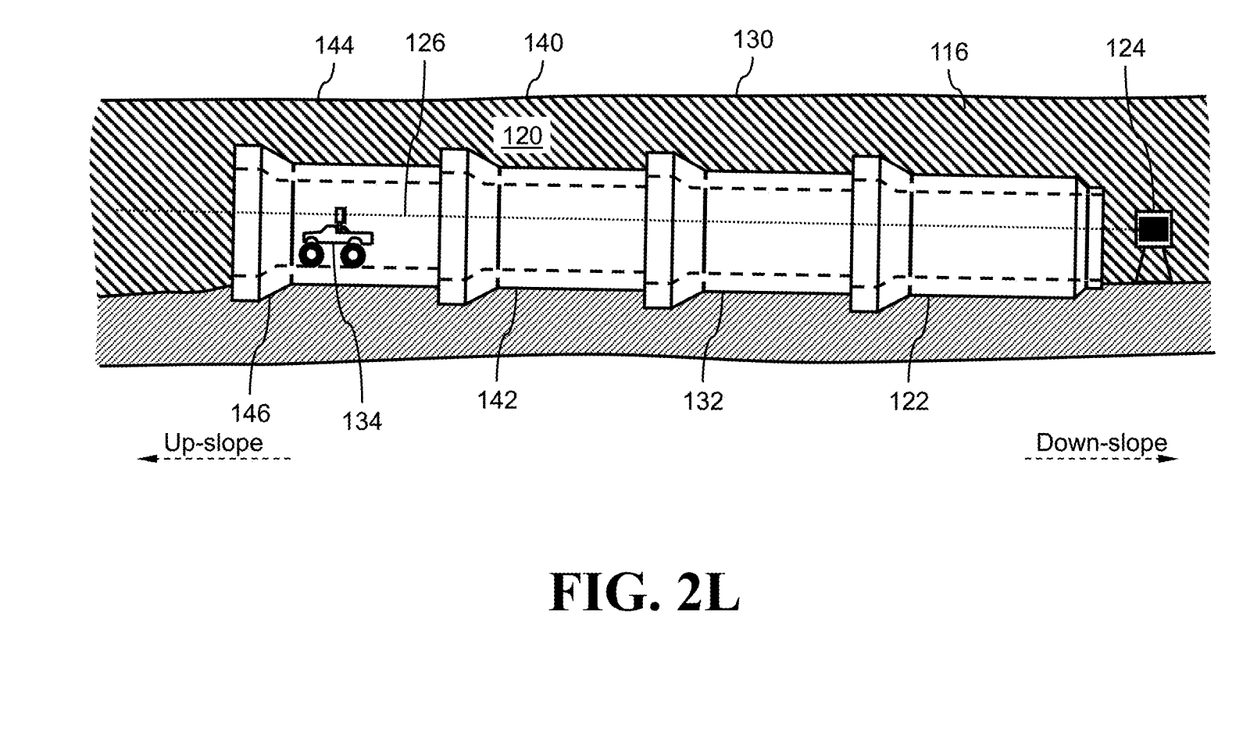
FIG. 2L is a cross-sectional side perspective view of the remote-controlled vehicle moving from the third pipe section to the additional pipe section.
Figure 2M:
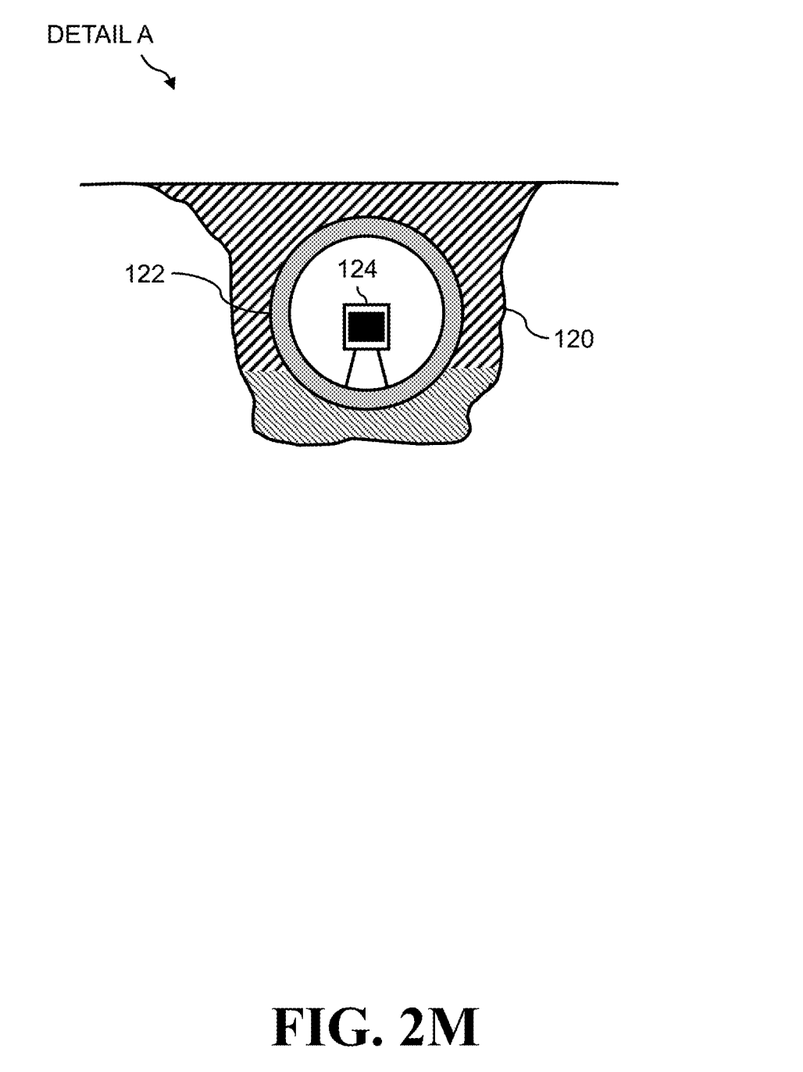
FIG. 2M is a trench end view of a pipe section of FIG. 2C at Detail A thereof.

This process is then continuously reiterated for additional pipe sections to complete assembly of the pipeline. Additional ditch and pipe sections are guided by the projected laser beam 126 and the RC vehicle 134. As each additional ditch section is excavated an additional pipe section is placed, and the previous ditch section backfilled with dirt and compacted, the RC vehicle 134 continues to navigate downstream from the laser beam apparatus 124 to maintain accurate alignment of the laser beam 126. FIGS. 2J-2L provide illustrations of an additional pipe section 146 being inserted into an additional ditch section 144 guided by the RC vehicle 134. Once each pipe section is complete, the camera may be used to check the quality of the joints.

Figure 3:
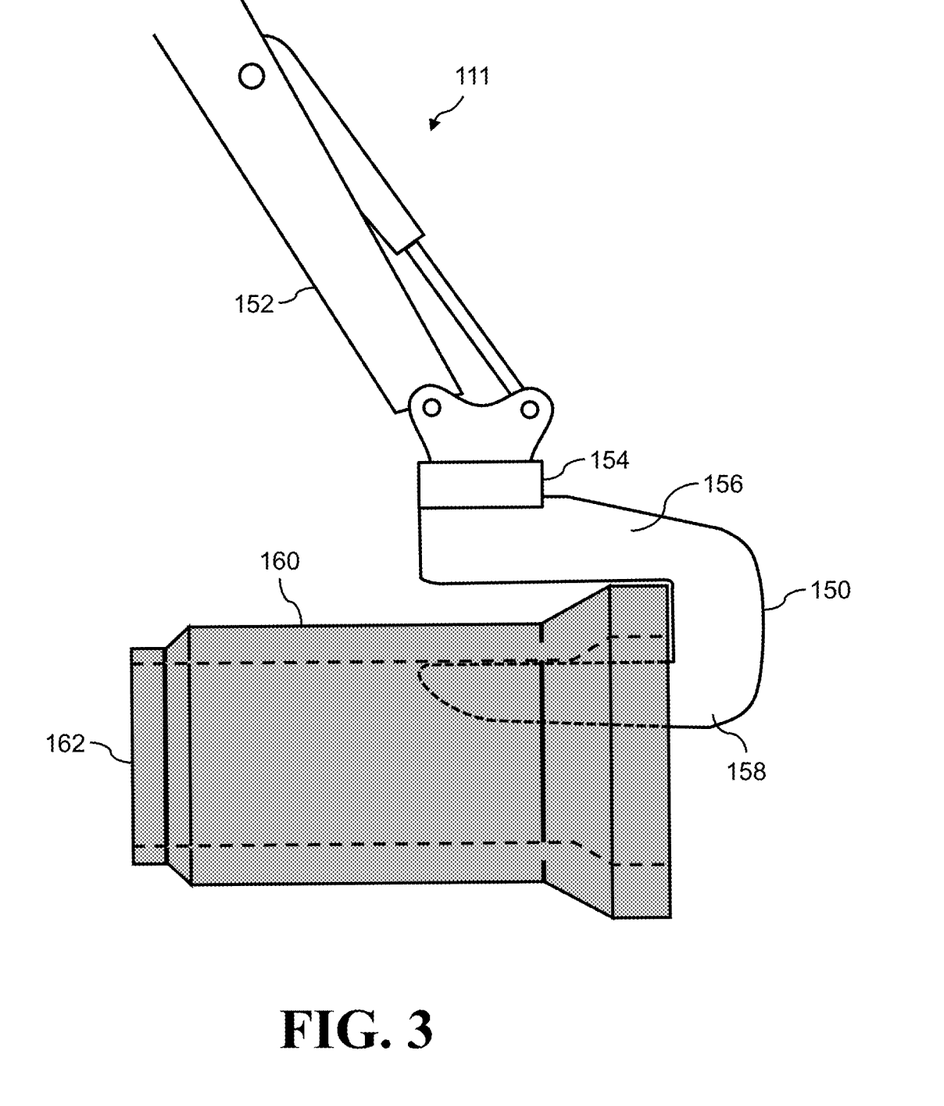
FIG. 3 is an enlarged perspective view of a pipe hook attached to an excavator with a roto-tilt attachment according to one embodiment.

FIG. 3 illustrates one embodiment of the excavator 111 with a pipe hook apparatus 150 as an attachment. The pipe hook apparatus 150 is connected to the arm 152 by a roto-tilt attachment 154. Examples of suitable roto-tilt attachment include the R1-R8 tiltrotors sold by Rototilt Inc. and incorporated herein by reference. The roto-tilt attachment is adapted to rotate the hook and tilt it at angle as needed.

The pipe hook apparatus 150 comprises a first prong 156 directly attached to the roto-tilt attachment 154 and a second prong 158 substantially parallel and spaced apart from the first prong 156. The second prong 158 extends inside the hole 162 and the spacing between the first and second prong is configured to receive a wall of the pipe 160. Once the hook 150 is inserted inside the hole 162, the arm 152 of the excavator then lifts the pipe section and the roto-tilt attachment 154 positions the pipe section as desired for insertion into the ditch and alignment with the pipeline.

Use of the pipe hook apparatus 150 eliminates the need for lifting cables, hooks, clevises and other similar structures that are traditionally required to lift pipe sections. The pipe hook apparatus also eliminates the need for trench boxes and workmen being in the ditch. The pipe hook apparatus 150 may be used as an attachment for various types of excavators, including but not limited to crawler, dragline, suction, long reach and mini excavators. Alternatively a grapple hook or a sling may be used. Also the excavators may include other attachments such as a compaction roller for tamping down the backfilled dirt or a spoon attachment for digging out underneath the pipe so that it lies flat in the trench.

Figure 4:
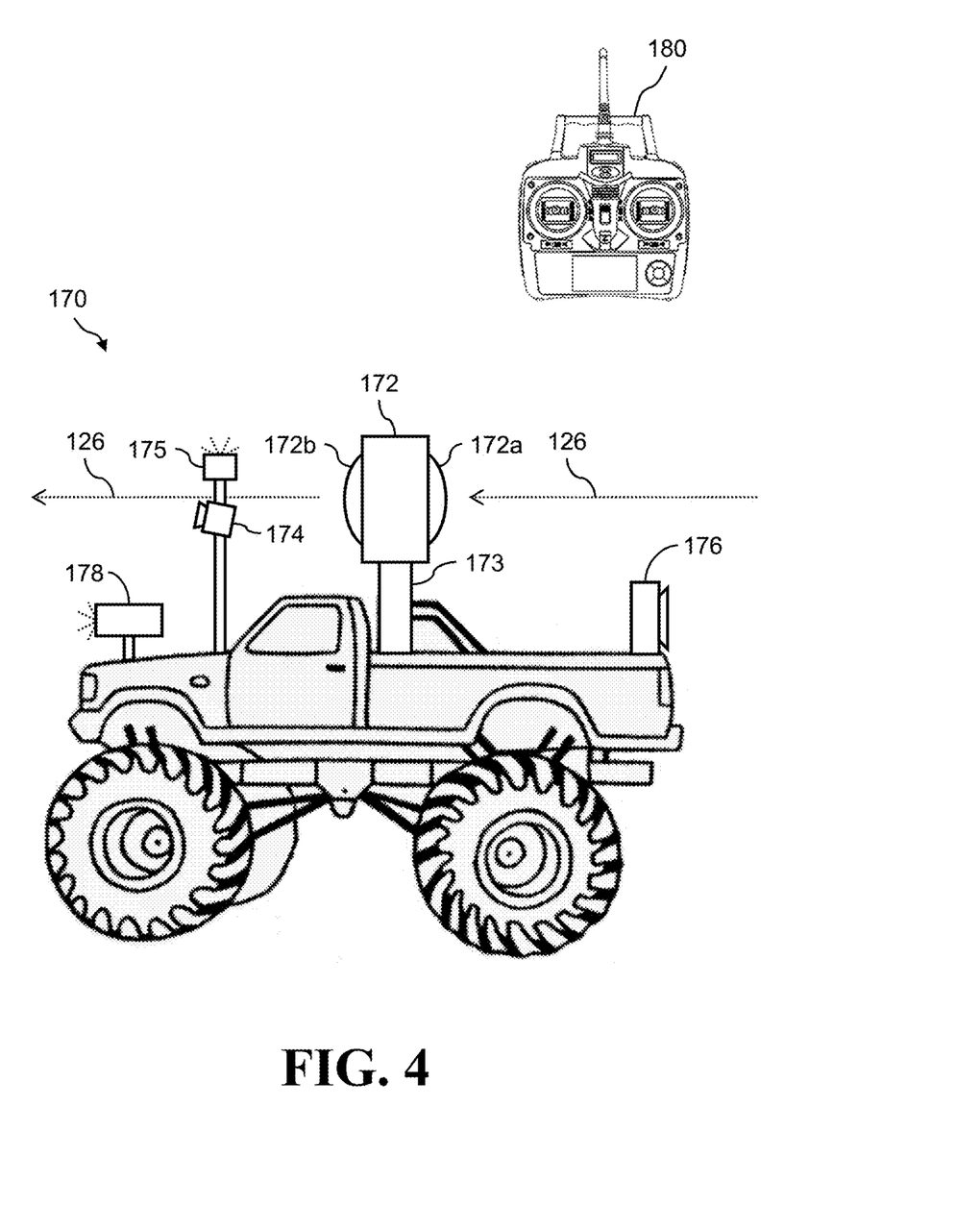
FIG. 4 is a remote-controlled vehicle equipped with various components for focusing a laser beam according to one embodiment.

One embodiment of a RC vehicle 170 adapted for focusing a laser beam 126 is depicted in FIG. 4. In this embodiment, the RC vehicle 170 is equipped with a target 172 to monitor a laser beam at one target face 172a and focus the laser beam forward at another target face 172b. The target 172 is on a stand 173 that adjusts up and down and may tilt the target 172. The RC vehicle 170 further includes a rotating and tiltable camera 174 with a light 175 and a back-up camera 176 to assist the user with navigating the vehicle by providing a video feed. One or more adjustable light sources 178 may also be installed on the RC vehicle 170 to illuminate the view during navigation.

Navigation of the RC vehicle 170 is controlled using a remote 180. The remote 180 may communicate with the RC vehicle 170 via various wireless protocols, including radio frequency (RF), Wi-Fi, and Bluetooth®. The video feed from the rotating camera 174 and back-up camera 176 may be viewed on a monitor on the remote or on a separate monitor. The remote 180 may also be configured to directly control positioning of the target 172.

In some embodiments, the RC vehicle is a land vehicle such as a car or truck. However, other embodiments of the RC vehicle may include aircrafts and watercrafts, such as drones, boats, and hovercrafts.

Although the present approach has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present approach.

That which is claimed:

1. A method for excavating a ditch and installing an underground pipeline therein comprising:
   a) excavating a first ditch section of the ditch utilizing a predetermined global positioning system (GPS) model having grading and alignment requirements for the ditch and the underground pipeline,
   b) inserting a first pipe and a laser beam apparatus associated therewith into the first ditch section,
   c) projecting a laser beam from the laser beam apparatus utilizing the grading and alignment requirements of the predetermined GPS model for excavation and installation of one or more additional sections of pipes;
   d) inserting a second pipe equipped with a remote-controlled vehicle into an excavated second ditch section and connecting the second pipe to the first pipe using the laser beam projected from the laser beam apparatus to guide grading of the excavated second ditch section and alignment of the second pipe with the first pipe;
   e) inserting an additional pipe into an additional excavated ditch section and connecting the additional pipe to the second pipe by focusing the laser beam with the remote-controlled vehicle to maintain the grading and alignment requirements of the predetermined GPS model while excavating the additional ditch section and aligning the additional pipe to the second pipe;
   f) navigating the remote-controlled vehicle from the second pipe to the additional pipe to guide grading of another ditch section and aligning another pipe; and
   g) completing the underground pipeline by repeating steps e) and f) with one or more pipes.

2. The method of claim 1, wherein excavating is done with a GPS digging excavator.

3. The method of claim 1, wherein the laser beam is focused by a rotating and tillable camera installed on the remote-controlled vehicle.

4. The method of claim 1 further including lifting each pipe with an insertion excavator having a pipe hook configured to be inserted into the first pipe and second pipe, and into the any one or more pipes of step g.

5. The method of claim 1, wherein navigation of the remote-controlled vehicle is guided by a front-facing camera and a rear-facing camera installed on the remote-controlled vehicle.

6. The method of claim 5, wherein the first pipe, second pipe and the any one or more pipes of step g are aligned using a roto-tilt attachment on an insertion excavator configured to angle, tilt, and rotate the pipes.

7. The method of claim 1 further including backfilling the ditch above the pipeline with dirt and compacting the dirt.

* * * * *